US007324246B2

(12) United States Patent
Enomoto

(10) Patent No.: US 7,324,246 B2
(45) Date of Patent: Jan. 29, 2008

(54) APPARATUS AND METHOD FOR IMAGE PROCESSING

(75) Inventor: Jun Enomoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 758 days.

(21) Appl. No.: 10/252,841

(22) Filed: Sep. 24, 2002

(65) Prior Publication Data

US 2003/0086134 A1    May 8, 2003

(30) Foreign Application Priority Data

Sep. 27, 2001   (JP)   ............................. 2001-297742

(51) Int. Cl.
   *H04N 1/46*   (2006.01)
(52) U.S. Cl. ...................... 358/538; 358/453; 358/1.2; 382/103; 382/118; 382/190; 382/164
(58) Field of Classification Search ................ 358/538; 382/103, 118
   See application file for complete search history.

(56) References Cited

U.S. PATENT DOCUMENTS

| 5,835,641 | A | * | 11/1998 | Sotoda et al. | ................ | 382/291 |
| 5,990,973 | A | * | 11/1999 | Sakamoto | ................... | 348/576 |
| 6,151,403 | A | * | 11/2000 | Luo | ........................... | 382/117 |
| 6,160,923 | A | * | 12/2000 | Lawton et al. | .............. | 382/275 |
| 6,396,599 | B1 | | 5/2002 | Patton et al. | ................. | 358/1.9 |
| 6,657,658 | B2 | * | 12/2003 | Takemura | .............. | 348/207.99 |
| 6,704,448 | B1 | * | 3/2004 | Hasegawa | ................... | 382/173 |
| 6,718,050 | B1 | * | 4/2004 | Yamamoto | ................... | 382/117 |
| 6,766,035 | B1 | * | 7/2004 | Gutta | ........................... | 382/103 |
| 6,795,209 | B1 | * | 9/2004 | Patton et al. | ............... | 358/1.18 |
| 6,801,642 | B2 | * | 10/2004 | Gorday et al. | .............. | 382/118 |
| 6,885,761 | B2 | * | 4/2005 | Kage | ........................... | 382/118 |
| 6,985,161 | B1 | * | 1/2006 | Politis | ........................ | 345/629 |
| 6,987,535 | B1 | * | 1/2006 | Matsugu et al. | ............ | 348/239 |

(Continued)

FOREIGN PATENT DOCUMENTS

JP    05-068245    3/1993

(Continued)

OTHER PUBLICATIONS

JP Office Action dated Jan. 9, 2007.

*Primary Examiner*—Twyler Lamb
*Assistant Examiner*—Benjamin Dulaney
(74) *Attorney, Agent, or Firm*—Sughrue Mion, Pllc.

(57) ABSTRACT

There is provided an image processing apparatus including an image processing unit for executing image processing based on image data of an image; a region extracting unit for extracting a main subject region corresponding to a main subject in said image for the image processing; and an image display unit for displaying the image in enlargement with the main subject region disposed at a center of image. There is also provided an image processing method for executing image processing based on image data of an image, comprising steps of: extracting a main subject region corresponding to a main subject in the image for the image processing; and displaying the image in enlargement with the main subject region disposed at a center of image The apparatus and the method as above allow the correction of a red-eye color, the trimming processing, and the freckle and wrinkle removing processing, all based on image data, to be easily confirmed and inspected in a short time.

33 Claims, 4 Drawing Sheets

U.S. PATENT DOCUMENTS

| | | | |
|---|---|---|---|
| 7,002,600 B2 * | 2/2006 | Okada et al. | 345/625 |
| 7,024,035 B1 * | 4/2006 | Enomoto | 382/167 |
| 7,072,526 B2 * | 7/2006 | Sakuramoto | 382/282 |
| 2001/0022649 A1 * | 9/2001 | Fukuma et al. | 351/227 |
| 2001/0026634 A1 * | 10/2001 | Yamaguchi | 382/118 |
| 2001/0040986 A1 * | 11/2001 | Farringdon et al. | 382/118 |
| 2002/0036701 A1 * | 3/2002 | Yamashita | 348/333.05 |

FOREIGN PATENT DOCUMENTS

| | | |
|---|---|---|
| JP | 9-179171 A | 7/1997 |
| JP | 10-233929 | 9/1998 |
| JP | 2000-76427 | 3/2000 |
| JP | 2000-216978 | 8/2000 |
| JP | 2001-148780 | 5/2001 |

* cited by examiner

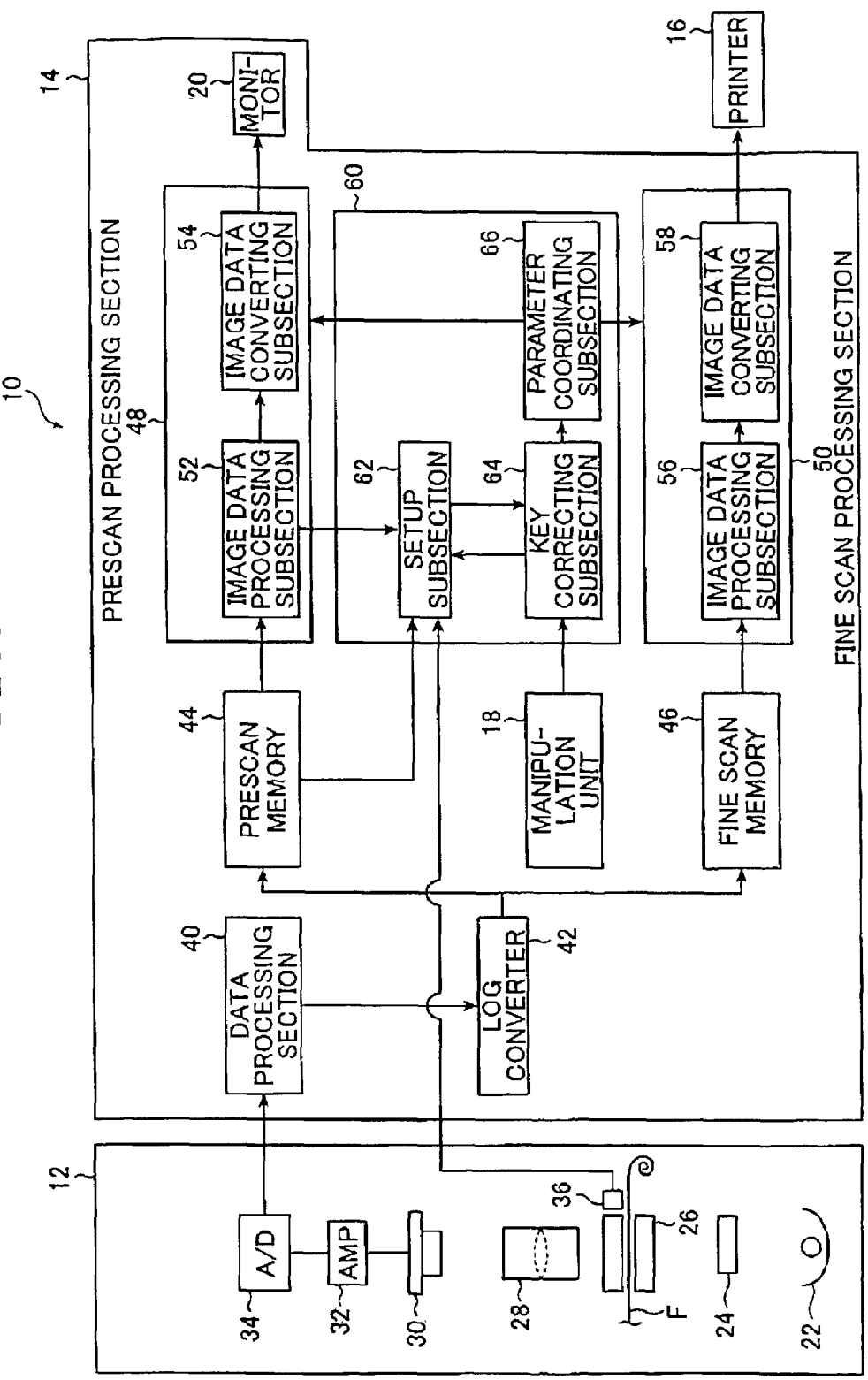

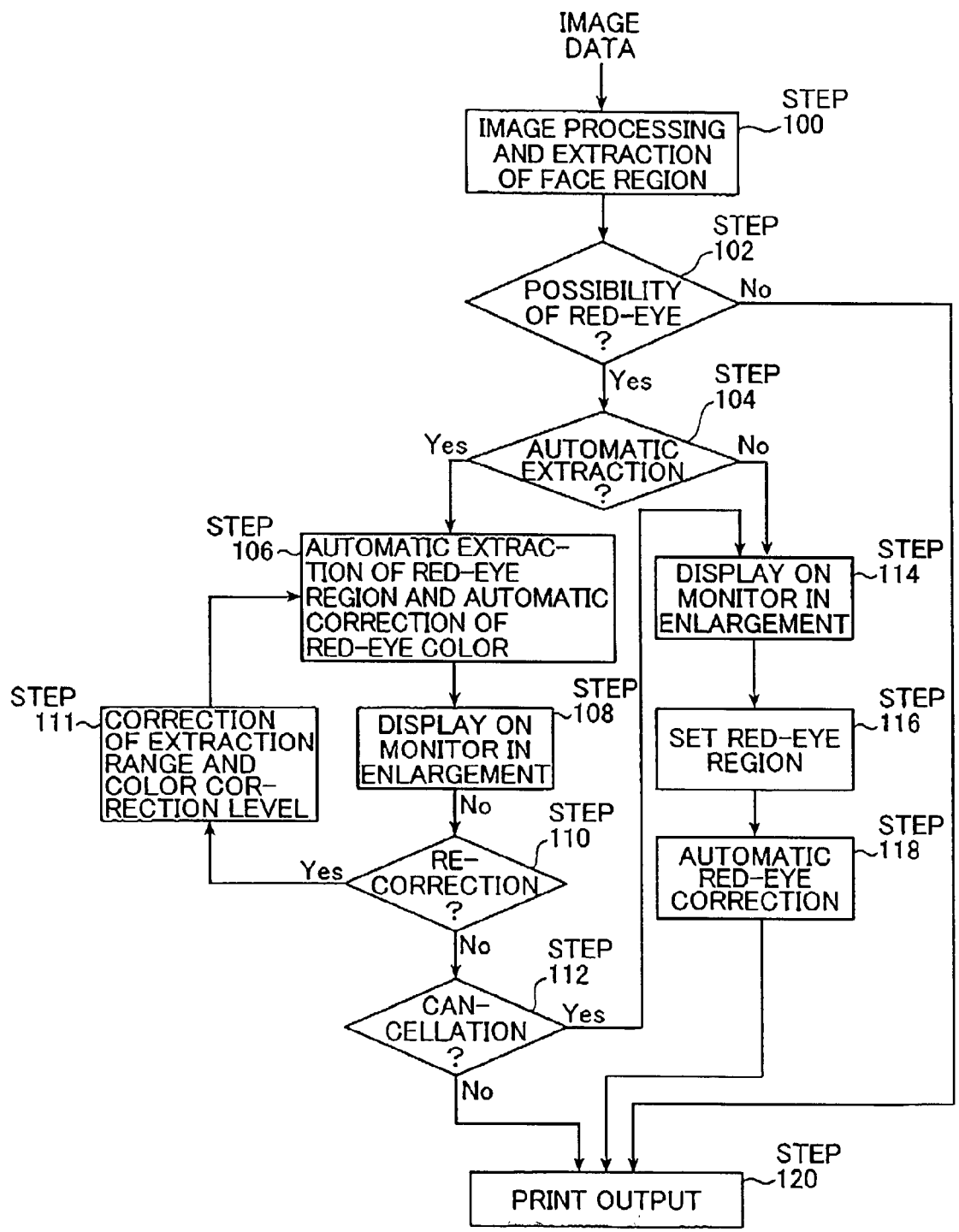

APPARATUS AND METHOD FOR IMAGE PROCESSING

BACKGROUND OF THE INVENTION

The present invention relates to image processing apparatus and method for executing image processing by extracting a main subject such as the face of a person in an image based on image data.

A printer that adopts digital exposure has recently been commercialized. In this "digital photoprinter", the image recorded on a film is read photoelectronically and converted into digital image data, which is subjected to various kinds of image processing to produce recording image data; and a light-sensitive material is scan exposed with recording light modulated in accordance with the output image data so as to record a (latent) image that is then processed photoelectronically to produce a (finished) print.

In the digital photoprinter, when image data obtained by digital exposure is printed, the exposing condition of the image data can be determined by processing the image data. Thus, prints of high quality, which cannot be heretofore obtained by the conventional direct exposure, can be obtained by preferably correcting, by means of such digital photoprinter, washed-out highlight of image and dull shadow of image due to photography with backlight or an electronic flash as well as executing graininess suppression processing for suppressing a rough surface (grainy state) that is outstanding in a low image density region due to a light-sensitive material, sharpness emphasis processing (sharpening processing), and the like. Further, correction of improper color due to red-eye, trimming processing, and the like can be easily executed. The red-eye means such a phenomenon that when a person is recorded from a front side using light emitted from an electronic flash, his or her pupils are recorded in red or gold (pupils recorded in gold is also called red-eye). This phenomenon is caused in such a manner that the light from the electric flash is incident on the pupils from the front in the state that the pupils are open and then reflected thereby regularly.

As a method of correcting the red-eye, JP 2000-76427, A, for example, discloses a method of extracting a red-eye region and a method of correcting the color of this region. According to the disclosure, in an x-y-z space, which is composed of an x-y plane, on which an image region including an eye region whose color is faulty is plotted, and a z-axis representing image characteristic amounts determined by any one of the hue, saturation, and lightness of each pixel in the image region or a combination of at least two thereof, the image region is separated to small regions in which the value of the z-axis has a mountain-like distribution. Then, the region of a pupil whose color is faulty is determined using the shape information, position information, area information, statistic image characteristic amounts, and the like of the respective small separate regions on the x-y plane, and the color of the region is corrected. According this method, it is possible to select only the region whose color must be corrected as a color correction required region, and in particular, it is possible to correctly select only the region of the pupil.

However, it is impossible to correct all the red-eyes even by this method. Further, since a region is erroneously extracted as a region whose color is to be corrected, it is necessary for an operator to confirm a result of color correction. Thus, a region corresponding to the eye portion of a person in an image must be displayed on a monitor, and the like in enlargement.

Incidentally, to display the region corresponding to the eye portion to be confirmed by displaying the image in enlargement, it is necessary to move the region corresponding to the eye portion to be confirmed to the center of the image displayed while enlarging and scrolling the region. Thus, the confirmation of the color correction executed in the region corresponding to the eye portion takes a relatively long time. Accordingly, in an image in which many persons are recorded, a problem is arisen in that a long time is consumed in the confirmation of the color correction and a processing efficiency drops.

This problem is also arisen similarly in freckle and wrinkle removing processing and further in trimming processing for outputting a print with the image of a person disposed at the center of print in enlargement, in addition to the red-eye color correction processing for confirming a small region in an image.

SUMMARY OF THE INVENTION

Accordingly, it is an object of the present invention, which was made to solve the above problems, to provide an image processing apparatus and an image processing method capable of effectively executing red-eye color correction processing, freckle and wrinkle removing processing, trimming processing, and the like in image processing apparatus and method for executing image processing based on image data.

In order to attain the object described above, the present invention provides an image processing apparatus comprising: an image processing unit for executing image processing based on image data of an image; a region extracting unit for extracting a main subject region corresponding to a main subject in the image for the image processing; and an image display unit for displaying the image in enlargement with the main subject region disposed at a center of image.

Preferably, when a plurality of the main subject regions are extracted by the region extracting unit, the image display unit displays the image in enlargement with each of the main subject regions thus extracted disposed at the center of image.

Preferably, the image display unit displays the image in enlargement according to a sequence of certainties of the extracted main subject regions.

Preferably, the certainty of the main subject region is determined using at least one of a position of the main subject region, a size of the main subject region, a direction of the main subject, and an image characteristic amount of the main subject region.

It is preferable that the main subject region in the image is a face region of a person, and the image processing apparatus further comprises: a determination device for determining whether or not a possibility that an eye region whose color is faulty is included in an image of the face region is high, wherein, when the determination device determines that the possibility that an eye region whose color is faulty is included in the image of the face region is high, the region extracting unit extracts an eye region whose color is to be corrected as well as the image processing unit corrects the color of the thus extracted eye region, and the image display unit displays an image showing a result of correction of the color of the eye region in enlargement with the eye region disposed at the center of image.

Preferably, when an instruction indicating that an eye region whose color has been corrected is improper is received, it is required to adjust a range of an eye region, which is to be extracted by the region extracting unit and whose color is to be corrected, in order to correct the color again.

Preferably, when an instruction indicating that a result of color correction is improper is received, it is required to adjust a correction level of color correction executed in the image processing unit in order to correct the color again.

It is preferable that the main subject region in the image is a face region of a person, and the image processing apparatus further comprises: a determination device for determining whether or not a possibility that an eye region whose color is faulty is included in an image of the face region is high, wherein, when the determination device determines that the possibility that an eye region whose color is faulty is included in the image of the face region is high, the image display unit displays the image with the face region disposed at the center of image, the region extracting unit requires to designate an eye region from the image displayed in enlargement to set an eye region whose color is to be corrected, and the image processing unit corrects the color of the thus designated eye region.

It is preferable that the main subject region in the image is a face region of a person, and the image processing apparatus further comprises: a determination device for determining whether or not a possibility that an eye region whose color is faulty is included in an image of the face region is high, wherein the region extracting unit has a region automatic-extraction mode for automatically extracting an eye region whose color is to be corrected and a region designation mode for requesting a designation of an eye region from the image of the face region displayed in enlargement on the image display unit in order to set the eye region whose color is to be corrected, either mode being effective when the determination device determines that the possibility that an eye region whose color is faulty is included in the image of the face region is high, and the region automatic-extraction mode and the region designation mode can be switched therebetween.

It is preferable that the main subject region in the image is a region having characteristics similar to those of an eye region, whose color is faulty, of a person, and the image processing apparatus further comprises: a determination device for determining whether or not a possibility that the region having characteristics similar to those of the eye region whose color is faulty is included in a face region of the person is high, wherein the region extracting unit has a region automatic-extraction mode for automatically extracting a face region of the person in which an eye region whose color is to be corrected is included and a region designation mode for requesting a designation of an eye region or a face region from an image of the region having characteristics similar to those of the eye region whose color is faulty displayed in enlargement on the image display unit in order to set the eye region whose color is to be corrected, either mode being effective when the determination device determines that the possibility that a region having characteristics similar to those of an eye region whose color is faulty is included in the face region is high, and the region automatic-extraction mode and the region designation mode can be switched therebetween.

Preferably, the determination device executes determination based on information about at least one of a recording time, a recording place, a light source for recording, lighting, presence or absence of emission by an electronic flash, a type of a camera used in recording, a recording exposure condition, and a result of analysis of a recorded scene.

Preferably, when a plurality of eye regions are corrected for color, the image display unit displays an image with each of the eye regions disposed at the center of image.

Preferably, the image display unit displays an image according to a sequence of sizes of the eye regions which have been corrected for color.

Preferably, when it is determined that a result of color correction is proper, a range of the eye region whose color is to be corrected and a correction level of color correction of the eye region are at least stored so that similar image processing may be executed repeatedly.

Preferably, the image processing unit executes trimming processing with the main subject region disposed at a center of trimming by using the image displayed in enlargement on the image display unit.

The present invention provides an image processing apparatus comprising: an image processing unit for executing image processing based on image data of an image; a region extracting unit for extracting a face region corresponding to a face of a person in the image for the image processing; a determination device for determining whether or not a possibility that an eye region whose color is faulty is included in an image of the face region is high; and a display unit for displaying at least the image of the face region, wherein the region extracting unit has a region automatic-extraction mode for automatically extracting an eye region whose color is to be corrected and a region designation mode for requesting a designation of an eye region from the image of the face region displayed on the display unit in order to set the eye region whose color is to be corrected, either mode being effective when the determination device determines that the possibility that an eye region whose color is faulty is included in the image of the face region is high, and the region automatic-extraction mode and the region designation mode can be switched therebetween.

Preferably, the determination device executes determination based on information about at least one of a recording time, a recording place, a light source for recording, lighting, presence or absence of emission by an electronic flash, a type of a camera used in recording, a recording exposure condition, and a result of analysis of a recorded scene.

Preferably, when a plurality of eye regions are corrected for color, the display unit displays an image with each of the eye regions disposed at the center of image.

Preferably, the display unit displays an image according to a sequence of sizes of the eye regions which have been corrected for color.

Preferably, when it is determined that a result of color correction is proper, a range of the eye region whose color is to be corrected and a correction level of color correction of the eye region are at least stored so that similar image processing may be executed repeatedly.

The present invention provides an image processing method for executing image processing based on image data of an image, comprises steps of: extracting a main subject region corresponding to a main subject in the image for the image processing; and displaying the image in enlargement with the main subject region disposed at a center of image.

Preferably, when a plurality of the main subject regions are extracted, the image is displayed in enlargement with each of the main subject regions thus extracted disposed at the center of image.

Preferably, the image is displayed in enlargement according to a sequence of certainties of the extracted main subject regions.

Preferably, the certainty of the main subject region is determined using at least one of a position of the main subject region, a size of the main subject region, a direction of the main subject, and an image characteristic amount of the main subject region.

It is preferable that the main subject region in the image is a face region of a person, and the image processing method further comprises steps of: determining whether or not a possibility that an eye region whose color is faulty is included in an image of the face region is high; as well as when it is determined that the possibility that an eye region whose color is faulty is included in the image of the face region is high, extracting an eye region whose color is to be corrected and correcting the color of the extracted eye region; and displaying an image showing a result of correction of the color of the eye region in enlargement with the eye region disposed at the center of image.

Preferably, when an instruction indicating that an eye region whose color has been corrected is improper is received, it is required to adjust a range of an eye region, which is to be extracted and whose color is to be corrected, in order to correct the color again.

Preferably, when an instruction indicating that a result of color correction is improper is received, it is required to adjust a correction level of color correction in the image processing.

It is preferable that the main subject region in the image is a face region of a person, and the image processing method further comprises steps of: determining whether or not a possibility that an eye region whose color is faulty is included in an image of the face region is high; as well as when it is determined that the possibility that an eye region whose color is faulty is included in the image of the face region is high, displaying an image with the face region disposed at the center of image; requiring to designate an eye region from the image displayed in enlargement to set an eye region whose color is to be corrected; and correcting the color of the thus designated eye region.

It is preferable that the main subject region in the image is a face region of a person, and the image processing method further comprises a step of: determining whether or not a possibility that an eye region whose color is faulty is included in an image of the face region is high, wherein the method includes a region automatic-extraction mode for automatically extracting an eye region whose color is to be corrected and a region designation mode for requesting a designation of an eye region from the image of the face region in order to set the eye region whose color is to be corrected, either mode being effective when it is determined that the possibility that an eye region whose color is faulty is included in the image of the face region is high, and the region automatic-extraction mode and the region designation mode can be switched therebetween.

It is preferable that the main subject region in the image is a region having characteristics similar to those of an eye region, whose color is faulty, of a person, and the image processing method further comprises a step of: determining whether or not a possibility that the region having characteristics similar to those of the eye region whose color is faulty is included in a face region of the person is high, wherein the method includes a region automatic-extraction mode for automatically extracting a face region of the person in which an eye region whose color is to be corrected is included and a region designation mode for requesting a designation of an eye region or a face region from an image of the region having characteristics similar to those of the eye region whose color is faulty in order to set the eye region whose color is to be corrected, either mode being effective when it is determined that a possibility that a region having characteristics similar to those of an eye region whose color is faulty is included in the face region is high, and the region automatic-extraction mode and the region designation mode can be switched therebetween.

Preferably, the determination is executed based on information about at least one of a recording time, a recording place, a light source for recording, lighting, presence or absence of emission by an electronic flash, a type of a camera used in recording, a recording exposure condition, and a result of analysis of a recorded scene.

Preferably, when a plurality of eye regions are corrected for color, an image is displayed with each of the eye regions disposed at the center of image.

Preferably, an image is displayed according to a sequence of sizes of the eye regions which have been corrected for color.

Preferably, when it is determined that a result of color correction is proper, a range of the eye region whose color is to be corrected and a correction level of color correction of the eye region are at least stored so that similar image processing may be executed repeatedly.

Preferably, trimming processing is executed with the main subject region disposed at a center of trimming by using the image displayed in enlargement.

The present invention provides an image processing method for executing image processing based on image data of an image, comprising steps of: extracting a face region corresponding to a face of a person in the image for the image processing; and determining whether or not a possibility that an eye region whose color is faulty is included in an image of the face region is high, wherein the method includes a region automatic-extraction mode for automatically extracting an eye region whose color is to be corrected and a region designation mode for requesting a designation of an eye region from the displayed image of the face region in order to set the eye region whose color is to be corrected, either mode being effective when it is determined that the possibility that an eye region whose color is faulty is included in the image of the face region is high, and the region automatic-extraction mode and the region designation mode can be switched therebetween.

Preferably, the determination is executed based on information about at least one of a recording time, a recording place, a light source for recording, lighting, presence or absence of emission by an electronic flash, a type of a camera used in recording, a recording exposure condition, and a result of analysis of a recorded scene.

Preferably, when a plurality of eye regions are corrected for color, an image is displayed with each of the eye regions disposed at the center of image.

Preferably, an image is displayed according to a sequence of sizes of the eye regions which have been corrected for color.

Preferably, when it is determined that a result of color correction is proper, a range of the eye region whose color is to be corrected and a correction level of color correction of the eye region are at least stored so that similar image processing may be executed repeatedly.

BRIEF DESCRIPTION OF THE DRAWINGS

FIG. 1 is a block diagram showing a schematic arrangement of an embodiment of a digital photoprinter using the image processing apparatus of the present invention;

FIG. 2 is a flowchart showing an example of the flow of red-eye color correction processing executed by the image processing apparatus of the present invention;

DETAILED DESCRIPTION OF THE INVENTION

Figure 3A:
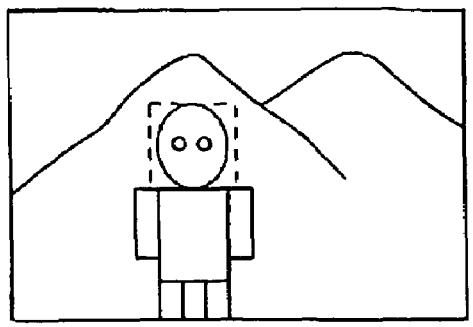
FIGS. 3A and 3B are views each showing an example of display screens obtained by the image processing apparatus of the present invention.

The image processing apparatus and the image processing method according to the present invention will be described below in detail with reference to a preferable embodiment shown in the accompanying drawings.

FIG. 1 shows a block diagram of an embodiment of a digital photoprinter having the image processing apparatus of the present invention for implementing the image processing method of the present invention.

The digital photoprinter (hereinafter, referred to as "photoprinter") 10 shown in FIG. 1 is a digital photoprinter that photoelectronically reads the images recorded on a film F and converts the read image into digital image data, which is then subjected to various kinds of image processing to produce output image data. Next, a light-sensitive material is scan exposed with recording light modulated in accordance with the output image data to thereby record the image which is then output as a print.

The photoprinter 10 is basically composed of a scanner (image reading apparatus) 12 for photoelectrically reading the images recorded on the film F, an image processing apparatus 14 for processing the image of image data having been read and for operating and controlling the photoprinter 10 in its entirety, and a printer 16 for exposing a light-sensitive material (photographic paper) with a light beam modulated in accordance with the image data output from the image processing apparatus 14, subjecting the image of the image data to development processing and outputting it as a (finished) print.

Connected to the image processing apparatus 14 are a manipulation unit 18, which has a keyboard and a mouse for inputting (setting) various conditions, selecting and instructing a specific processing step and entering various commands for effecting color/density correction and the like, and a monitor 20 for displaying the image read by the scanner 12, various kinds of manipulative commands and pictures for setting and registering various conditions. The monitor 20 corresponds to an image display unit in the present invention that displays an image in enlargement with a main subject region such as a face region and the like of the image of a person having been extracted disposed at the center of the image, as described below. Naturally, the monitor 20 may also function as a unit for merely displaying images, that is to say, it may display an image without enlargement with a main subject region such as a face region of the image of a person having been extracted disposed at the center of the image.

The scanner 12 is a device with which the images recorded on the film F or the like is read photoelectrically frame by frame. The scanner 12 includes a light source 22, a variable diaphragm (not shown), a diffuser box 24 with which the reading light incident on the film F is made uniform on the surface direction of the film F, carriers 26 for transporting the film F to a predetermined reading position, an imaging lens 28, an image sensor 30 having line CCD sensors corresponding to the reading of respective R (red), G (green), and B (blue) images, an amplifier 32, and an analog/digital (A/D) converter 34.

Further, the carriers 26 are dedicated carriers that can be detachably mounted on the main body of the scanner 12 in accordance with the type of the film F (photographic film such as a 240-sized film used in Advanced Photo System, a 135-sized negative film, or a reversal film) with the forms of films such as a strip and a slide, and the various types of the films can be subjected to various kinds of processing by the replacement of the carriers 26. The image (frames) recorded on the film F and used to produce prints are transported to a predetermined reading position by the carriers.

The images (frames) recorded on the film F and used to produce the prints are transported to and held at the predetermined reading position by any one of the carriers.

When the images, which have been recorded on the film F, are read with the scanner 12 arranged as described above, the reading light, which has emitted from the light source 22 and the quantity of which has been regulated by the diaphragm (not shown), is incident on the film F located at the predetermined position by the carrier and passes therethrough, thereby projecting light carrying the images recorded on the film F can be obtained.

The carrier 26 includes transport roller pairs (not shown) and a mask (not shown). The transport roller pairs are disposed in a sub-scan direction across the predetermined reading position and transports the film F with the lengthwise direction of the film F being in coincidence with the sub-scan direction perpendicular to the direction in which the line CCD sensor of the image sensor 34 extends (main scan direction) while locating the film F at the predetermined reading position. The mask has a slit that is located in correspondence to the reading position and extends in the main scan direction so as to regulate the projecting light of the film F to a predetermined slit shape. Incidentally, the APS film has transparent magnetic film layers formed on and under the respective frames thereof so as to record recording information on the magnetic layers. In correspondence to the APS film arranged as described above, each carrier 26 has a recording information reading unit 36 disposed thereto so that the recording information can be read by the recording information reading unit 36 when the images recorded on the APS film are read.

The reading light is incident on the film F while the film F is located at the reading position by the carrier 26 and transported in the sub-scan direction. This operation results in that the film F is two-dimensionally slit scanned by the slit extending in the main scan direction, and the images recorded on the respective frames of the film F are read thereby.

The reading light passes through the film F held by the carrier 26 and arranged as the projecting light carrying the image, and the projecting light is imaged on the light receiving plane of the image sensor 30 by the imaging lens unit 28.

The image sensor 34 is arranged as a so-called three-line color CCD sensor having three line CCD sensors for reading a red image, a green image, and a blue image, and each line CCD sensor extends in the main scan direction, as described above. The projecting light of the film F is separated into three R, G, B primary colors by the image sensor 30 and photoelectrically read.

The signals output from the image sensor 30 are amplified by the amplifier 32, converted into digital signals by the A/D converter 34, and supplied to the image processing apparatus 14.

The scanner 12 reads the images recorded on the film F twice. That is, the scanner 12 executes prescan for reading the image at a low resolution and fine scan for obtaining the image data of an output image.

The prescan is executed under prescan reading conditions which are set beforehand so that the image sensor 30 can read all the film images as scanning targets of the scanner 12. In contrast, the fine scan is executed under the fine scan reading conditions which are set to each image (frame) from prescan data so that the image sensor 30 is saturated at a density somewhat lower than the minimum density of each image (frame).

The image data in the prescan and the image data in the fine scan are basically the same data except that they have a different resolution and a different output level.

In the digital photoprinter 10, the scanner 12 is not limited to a scanner that reads an image by slit scan but may be a scanner making use of areal reading by which the image of one frame can be read at a time through reading light irradiated to the entire surface of the image of the one frame. In this case, an area CCD sensor, for example, is employed, a filter insertion unit for inserting R, G, and B color filters is interposed between the light source and the film F, and the image recorded on the film is read with the area CCD sensor by sequentially inserting the R, G, and B color filters so that the image is read after it has been separated into the three primary colors.

As described above, the digital signals output from the scanner 12 is supplied to the image processing apparatus 14 (hereinafter, abbreviated as "processing apparatus 14").

Note that while what is subjected to the image processing executed in the embodiment is the digital image data obtained by reading the images of the film F by the scanner 12 and subjecting the images having been read to A/D conversion, the image data recorded by a digital still camera, and the like, the image data of photographed images recorded in various image data recording mediums (media), and the image data of a recorded image obtained through various networks may be also subjected to the image processing.

Consequently, it is preferred that the image processing apparatus 14 comprises an image input means for such image data as above (not shown), exemplified by an image data input port, a drive for a certain image data recording medium, and a network communications means.

The processing apparatus 14 includes a data processing section 40, a log converter 42, a prescan memory 44, a fine scan memory 46, a prescan processing section 48, a fine can processing section 50, and a condition setting section 60.

Note that the processing apparatus 14 shown in FIG. 1 shows mainly the sections relating to image processing. However, the processing apparatus 14 is provided with a CPU for controlling and managing the photoprinter 10 including the processing apparatus 14 in its entirety, a RAM, a ROM, and the like for storing information necessary to the operation and the like of the photoprinter 10, in addition to the above sections. Further, the manipulation unit 18 and the monitor 20 are connected to respective sections through the CPU and the like (CPU bus).

The respective R, G, B digital signals supplied from the scanner 12 are subjected to predetermined data processing such as darkness correction, defective pixel correction, shading correction, and the like in the data processing section 40, and converted into digital image data by the log converter 42. Then, prescan image data (prescan data) is stored in the prescan memory 44 and fine scan image data (fine scan data) is stored in the fine scan memory 46, respectively.

The prescan data stored in the prescan memory 44 is read out by the prescan processing section 48 having an image data processing subsection 52 and an image data converting subsection 54 or in the setup subsection 62 of the condition setting section 60 and processed therein. In contrast, the fine scan data stored in the fine scan memory 46 is read out by the fine scan processing section 50 having an image data processing subsection 56 and an image data converting subsection 58 and processed therein.

The image processing subsection 52 of the prescan processing section 48 and the image data processing subsection 56 of the fine can processing section 50 are sections for executing predetermined image processing in accordance with the processing conditions set by the condition setting section 60, which will be described layer, and can basically execute the same processing except that the image data to be processed by them has a different resolution.

While the image processing executed by both the processing sections includes at least electric magnification processing for fitting an output image to an image size, processing other than it is not particularly limited, and various kinds of known processing are exemplified. For example, gray balance adjustment using a look-up table (LUT), gradation adjustment, density (brightness) adjustment, recording light source type correction and image saturation adjustment (color adjustment) executed by a matrix (MTX), graininess suppression processing, sharpness emphasis processing, dodging processing (compression and extension of density dynamic range), and the like are executed. Further, after the above processing has been executed, red-eye color correction processing, freckle and wrinkle removing processing and further trimming processing are executed in response to an instruction from an operator.

The image data converting section 54 thins out the image data having been processed in the processing section 52, when necessary, converts the resultant image data using, for example, a three-dimensional (3D) look-up table (LUT) and the like, and outputs the image data to the monitor 20 as image data that can be displayed thereon.

The image data converting subsection 58 converts the image data having been processed in the image data processing subsection 56 using, for example, a three-dimensional (3D) look-up table (LUT) or the like and outputs the image data to the printer 16 as image data that can be recorded thereby.

The condition setting section 60 has a setup subsection 62 for setting various kinds of processing conditions in the prescan processing section 48 and the fine can processing section 50, a key correcting subsection 64, and a parameter coordinating subsection 66.

The setup subsection 62 reads the prescan data from the prescan memory 44, creates a density histogram and calculates the image characteristic amounts such as an average density, highlight (minimum density), shadow (maximum density), and the like using the prescan data, and determines the reading conditions in the fine scan. Further, the setup subsection 62 sets various kinds of image processing conditions in the prescan processing section 48 and in the fine can processing section 50 such as the creation of LUTs for executing the gray balance adjustment, gradation adjustment, and density adjustment, the creation of an MTX operation formula, and the like in response to an instruction and the like made from the operator as necessary, in addition to the creation of the density histogram and the calculation of the image characteristic amounts.

When the processing for correcting the red-eye color of a person in an image, the freckle and wrinkle removing processing and the trimming processing are additionally executed, the setup subsection 62 extracts and sets a region corresponding to the face (hereinafter, referred to as "face region") of a person acting as a main subject from the image and in the sequence of importance thereof. That is, the setup subsection 62 corresponds to a region set unit for setting a main subject region corresponding to the main subject in the image. A method of extracting the face region of a person will be described later.

Further, the setup subsection 62 determines recording exposure conditions such as under exposure, over exposure, and the like from the density histogram, and further obtains a result of scene analysis by determining a recorded scene such as a scene in which a person is photographed and a scene in which a landscape is photographed based on a result of extraction of the face region of the person.

The parameter coordinating subsection 66 is a subsection for receiving the image processing conditions set by the setup subsection 62, for coordinating them with the adjustment amount of the image processing conditions, and for sending the resultant image processing conditions to the prescan processing section 48 as well as for coordinating the processing conditions of the image processing applied to the fine scan data, and the like and for setting them to the fine scan processing section 50.

The printer 16 is a device for forming a latent image by two-dimensionally scan exposing a light-sensitive material with a light beam modulated in accordance with the image data supplied from the processing apparatus 14, for subjecting the latent image to predetermined development processing, and the like, and for outputting an image recorded on the film as a reproduced visible image recorded on a print.

Note that, in the embodiment, the image data having been subjected to the image processing may be recorded on a recording medium such as a flexible disc, a magneto-optical MO) disc, a Zip, and the like. Further, the image data may be transmitted through a network.

The setup subsection 62 described above will be explained here in detail.

The setup subsection 62 extracts the face region of the person using a known method based on the image data having been subjected to know image processing in the image data processing subsection 52. The face region is extracted by, for example, the method disclosed in JP 2000-137788 A.

In the method disclosed in JP 2000-137788 A, first, face candidate regions are extracted by a known method. The face candidate regions are extracted by extracting regions in which a cluster (group) that is determined within a flesh color exists (refer to JP 52-156624 A, JP 52-156625 A, JP, 53-12330 A, JP 53-145620 A, JP 53-145621 A, JP 53-145622 A, and the like). The face candidate regions are extracted in such a manner that a histogram as to a hue value (and saturation value) is determined based a plurality of image data, the thus determined histogram is separated to peaks and valleys, the plurality of image data are separated to groups corresponding to the separated peaks by determining which one of the plurality of image data belongs to which one of the thus separated peaks, images are derived from the respective groups of the image data and arranged as a plurality of separated image regions, and the regions corresponding to the face region of a person are presumed from the plurality of thus separated image regions and set as the face candidate regions (refer to JP 04-34633 A). Further, the face candidate regions are extracted by the methods disclosed in JP 08-122944 A, JP 08-183925 A, and JP 09-138471 A, and further by the method disclosed in JP 09-138471 A, in addition to the above method.

Further, the regions, which are included within the range of specific colors such as the blue of sky and sea, the green of lawns and trees, and the like and apparently belong to a background on a color coordinate system may be removed as a background region, and the remaining non-background regions may be extracted as the face candidate regions.

Next, each of the extracted face candidate regions is separated to a plurality of separate regions, an edge emphasis cumulated value is determined by determining an edge emphasis corresponding to an amount of change of density in the separate regions making use of the phenomenon that the density of the eye region of a person greatly and frequently changes, the determined edge emphasis cumulated value is checked with the matching pattern of an edge emphasis cumulated value previously set as to a region corresponding to the region of a person so as to determine the degree of match of the face candidate region, thereby determining the degree of match of the face candidate region as the face of a person. Incidentally, the density of the eye region of a person is distributed convexly in a high density direction, and the density of the cheek region of the person is distributed convexly in a low density direction. Thus, as another method, a region having the above density distribution is determined in the extracted face candidate regions making use of the above distribution pattern of the density, the relative position of the above region in the face candidate regions and the area ratio of the above region to the face candidate regions are determined, and the degree of match of the face candidate regions is determined by comparing the above relative position and the above area ratio with the relative positions and the area ratios of the eye portion and the cheek portion in an actual face, thereby determining the degree of match of the face candidate regions as the face of the person.

In this case, when the images recorded on the APS film are read by the scanner 12, the information recorded on the magnetic films and indicating a top/down direction can be read by the recording information reading unit 36. Thus, the degree of correspondence between the directions of the separate region having the above high edge emphasis cumulated value and the region having the above density distribution to the face candidate region (direction in which the region corresponding to the eye portion in the face candidate region is positioned) and the above top/down direction is examined using the thus read information of the top/down direction and reflected to the degree of match of the face candidate regions as the face of the person. That is, the direction of the face candidate region is taken into consideration.

Next, a weight score is set to each of the face candidate regions in accordance with the thus determined degree of match. At the time, the rate of area of the face candidate region to the background candidate region other than the face candidate region (area ratio) and the degree of uneven distribution of the background region to the periphery of the image are determined, and the weight score is adjusted according to the area ratio and the degree of uneven distribution. For example, when the area ratio is very large or when the degree of uneven distribution is very high, the weight score is set to a small value.

The thus set weight score is compared with a predetermined threshold value, and when a face candidate region has a weight score larger than the threshold value, the face candidate region is set as the face region of the person.

The above example is the method disclosed in JP 2000-137788 A. In addition to the above method, however, when the face candidate region is extracted using the methods disclosed in JP 52-156624 A, JP 52-156625 A, JP 53-12330 A, JP 53-145620 A, JP 53-145621 A, JP 53-145622 A, and the like described above and when it is determined that the weight score set to the face candidate region using the methods disclosed in JP 2000-148980 A and JP 2000-149018 A is larger than the predetermined threshold value, the face candidate region may be set as the face region of the person.

That is, the degree of certainty of the face of the person corresponding to the main subject is determined by the weight score determined using the ratio of the area of the face candidate region to the area of the background candidate region (area ratio) that represents the size of the face candidate region, the degree of uneven distribution of the background region to the periphery of the image that represents the position of the face candidate region, the direction of the face candidate region, the image characteristic amounts such as the above density distribution and edge emphasis cumulated value, and the like, and the face region is selected from the face candidate regions based on the weight score and set.

The information of the face region having been set as described above is stored in the setup subsection 62 as well as supplied to the prescan processing section 48 through the parameter coordinating subsection 66 and used for the red-eye color correction processing, freckle and wrinkle removing processing and trimming processing executed for the prescan data. Further, the information of the face region stored in the setup subsection 62 is supplied to the fine can processing section 50 and used for the red-eye color correction processing executed for the fine scan data.

Here, the red-eye color correction processing, freckle and wrinkle removing processing, and trimming processing are executed in the image data processing subsections 52 and 56 using the image data that has been subjected to the gray balance adjustment, gradation adjustment, and the density (brightness) adjustment in the image data processing subsections 52 and 56 and has been subjected to the recording light source type correction and image saturation adjustment by the matrix (MTX).

In the setup subsection 62, in the correction of a defect present in a main subject region such as an eye region, including the color correction of an eye region whose color is faulty as a result of red-eye phenomenon etc., whether or not the possibility of occurrence of a defect such as the red-eye is high is determined from recording information, results of analysis of a recorded scene, and so forth. For example, the setup subsection 62 determines whether or not the possibility that a defect is present in a main subject region is high, based on information about at least one of the recording time, the recording place, the light source for recording, lighting, presence or absence of emission by an electronic flash, type of the camera used in recording, recording exposure conditions, and results of analysis of the recorded scene. In the case of an APS film, the recording information reading unit 36 as a magnetic information reading unit can read the recording information about at least one of the recording time, the recording place, presence or absence of light emitted by an electronic flash, recording exposure conditions, and type of the camera used in recording. In the case of image recording by a digital still camera, recording information can be read from headers and footers of the image data, and the like. In addition, recording information may be entered on the part of camera and read in the photoprinter 10, or alternatively, it may be entered on the part of the photoprinter 10.

Using the recording information obtained in such a manner as above, and further using the recording exposure conditions and the scene analysis results obtained in the setup subsection 62 itself, the setup subsection 62 can determine whether or not the possibility of occurrence of a defect such as the red-eye is high. It is needless to say that the recording information may be obtained with reference to customer information provided from a customer and a customer card created beforehand.

Since the red-eye is occurred when the light emitted by the electronic flash is regularly reflected by an eye, whether or not the possibility of occurrence of the red-eye is high can be determined by the presence or absence of light emitted by the electronic flash. In addition to the above, the possibility can be also determined by determining whether or not recording is executed at a time requiring the light emitted by the electronic flash or by determining whether a recording place is indoor or outdoor. The information of the recording place can be obtained when recording is executed using a camera capable of obtaining recording position information by means of a global positioning system (GPS).

Further, it has been found that the red-eye is liable to occur in a camera without pre-light emission and in a camera in which a lens is disposed relatively nears to an electronic flash. Thus, when the types of these cameras are stored as information, it can be easily determined whether or not a certain camera is a type of camera by which the red-eye is liable to be occurred the type of a camera from the information of the types of the cameras in the recording information.

Whether or not the possibility of occurrence of the red-eye is high can be determined from the thus obtained recording information in a comprehensive manner. When it is determined that the possibility of occurrence of the red-eye is high, the color of the red-eye is corrected.

Note that the condition setting section 60 of the embodiment sets the image processing conditions by applying the red-eye color correction not only to the fine scan data but also to the prescan data. In the present invention, however, when it is determined that the possibility of occurrence of the red-eye is high from the prescan data, the setup subsection 62 may record this information, and the red-eye color may be corrected by automatically extracting and setting the region of the red-eye whose color is to be corrected in the fine scan data based on the information. At the time, while an image based on the fine scan data is displayed on the monitor 20, it is preferable that the above information be presented together with the displayed image. With this operation, the operability of image processing is improved as well as a processing time can be reduced.

Further, the region of the red-eye may be automatically extracted and set and the color thereof may be corrected by determining whether or not the possibility of occurrence of the red-eye is high based on the fine scan data without using the prescan data.

The color correction of the red-eye itself is executed by a known method in the image data processing subsection 52 of the prescan processing section 48. However, the region of the red-eye whose color is to be corrected is extracted by a know method from the face region of the person extracted in the setup subsection 62 by supplying the image data having been subjected to the various kinds of image processing to the setup subsection 62. The extraction of the region of the red-eye whose color is to be corrected and the correction of the color are executed by the image processing method disclosed in, for example, JP 2000-76427 A.

Specifically, of the separate regions separated to determine the degree of match with the matching pattern used to extract the face region, notice is paid to a region having a large edge cumulated value in correspondence to an eye region and to a region in which the density distribution is made convex in the high density direction in correspondence to an eye region. Then, in an x-y-z space, which is composed of an x-y plane on which the region is plotted, and a z-axis representing image characteristic amounts determined by any one of the hue, saturation, and lightness of each pixel in the image region or a combination of at least two thereof, the region is separated to small regions in which the value of the z-axis has a mountain-like distribution. Then, the region of a pupil having faulty color is determined using the shape information, position information, area information, statistic image characteristic amounts, and the like on the x-y plane of each separate region. That is, the separated small regions are represented by scores using the shape information, position information, area information, statistic image characteristic amounts, and the like, and the separated small region having the largest score is set as the region whose color is to be corrected. Since the region whose color is to be corrected is determined by the score, the range of the eye region to be extracted can be adjusted by setting a threshold value used in the determination. Further, the range of the eye region to be extracted can be adjusted by setting the above separate regions again in response to an instruction from the operator.

The information of the range of the extracted eye region is supplied to the image data processing subsection 52 through the parameter coordinating subsection 66.

The red-eye color is corrected in the image data processing subsection 52 using the brightness of a pixel whose color is to be corrected, and this brightness is determined by the method described below. That is, when a pixel in the region whose color is to be corrected has a minimum brightness of the pixels in the region, the minimum pixel is used as a reference brightness, and the brightness of the pixel whose color is to be corrected is determined by subtracting a value, which is obtained by multiplying the difference between the brightness of the pixel whose color is to be corrected and the reference brightness by a predetermined value, from the brightness of the pixel whose color is to be corrected. In this case, a color correction level can be arbitrarily adjusted by adjusting the above predetermined multiple. While the above example shows the case in which the brightness is corrected, the saturation of the region whose color is to be corrected may be corrected in accordance with the color correction level using a minimum saturation as a reference saturation similarly to the above brightness correction method.

In addition to the above color correction methods, the color may be corrected by radially forming a gradation pattern from the center of the region whose color is to be corrected to the peripheral edge thereof and designating the gradation pattern so that the density thereof is made pale from the center to the peripheral edge.

A result of correction of the red-eye color is displayed on the monitor 20 in enlargement as one screen of an image to be inspected with the face region and more preferably the eye region in the image disposed at the center thereof. With this operation, whether or not the red-eye color is properly corrected can be inspected in a short time. It is needless to say that when the eye region is erroneously extracted, the extracted region can be cancelled.

Note that when a plurality of face regions are extracted from an image, images as many as the extracted face regions are disposed side by side and displayed in enlargement with the face regions and more preferably the eye regions disposed at the centers of the images. With this operation, whether or not the red-eye arises can be inspected as to each of the extracted regions. In this case, it is preferable to display the face regions on the monitor 20 in the sequence of certainty of the face regions as a face (in the sequence of higher certainty or lower certainty). Otherwise, the extracted face regions may be displayed on the monitor 20 in enlargement in the sequence the size of the red-eye regions whose color has been corrected with the extracted face regions disposed at the centers of the images. The images displayed in enlargement with the eye regions disposed at the centers thereof may be displayed on the monitor 20 individually, in an overlapped fashion, or sequentially.

When the operator determines that the red-eye color is not properly corrected and instructs to correct the color again, the setup subsection 62 requires the operator to execute at least one of the adjustment of the range of the eye region whose color is to be corrected and the adjustment of the above color correction level to correct the color again. For example, when an instruction indicating that the eye region whose color has been corrected is improper is received from the operator, the range of the eye region whose color is to be corrected is adjusted. Further, when an instruction indicating that a result of color correction is improper is received from the operator, the color adjustment level is adjusted. As described above, the red-eye color is repeatedly corrected until it is properly corrected.

The red-eye color is corrected by a region automatic-extraction mode in which a red-eye region is automatically extracted from an eye region and the color of the red-eye is automatically corrected. In the present invention, however, the red-eye color may be corrected by a region designation mode in which the region of the red-eye whose color is to be corrected is set by the operator who directly designates the region of the red-eye whose color is to be corrected. In the region designation mode, when it is determined that the possibility of occurrence of the red-eye is high, a face region is displayed on the monitor 20 in enlargement, the setup subsection 62 requires to designate an eye region whose color is to be corrected using the image of the face region displayed in enlargement, and the image data processing subsection 52 corrects the red-eye color in the designated eye region. When a plurality of face regions are extracted, images are displayed in enlargement with the respective face regions disposed at the centers of the images. In this case, it is preferable for the monitor 20 to display the images in enlargement with the regions having a large edge cumulated value in correspondence to the eye regions or the regions in which a density distribution is convex in a high density direction in correspondence to the eye regions, of the extracted face regions and more preferably of the separate regions used when the face regions are extracted, disposed at the centers of the images so that the operator can easily designate the red-eye regions whose color is to be corrected. The images displayed in enlargement may be disposed on the monitor 20 individually, in an overlapped fashion, or sequentially. Then, the color of the designated regions is automatically corrected according to the color correction level. All the red-eye regions whose color is to be corrected can be corrected as described above. It is needless to say that the color correction level may be arbitrarily adjusted.

Since the eye region whose color is to be corrected is designated by the operator, even if it is difficult to automatically extract a red-eye region whose color is to be from an image, the color of the red-eye region of the image can be easily corrected. It is preferable to switch the region automatic-extraction mode to the region designation mode when an eye region whose color is to be corrected cannot be properly extracted by the region automatic-extraction mode. Further, the operator may set these modes so that they are arbitrarily switched. Further, any one of the region automatic-extraction mode and the region designation mode may be provided.

After it has been confirmed that the inspection executed by the operator is proper, that is, that the image having been subjected to the various kinds of image processing including the correction of the red-eye color is proper, the red-eye region whose color is to be corrected, the red-eye color correction level, and the like are stored in the setup subsection 62 together with the other image processing conditions. Then, the red-eye region whose color is to be corrected, the red-eye color correction level, and the other image processing conditions that have been stored are called and used to the image processing applied to the fine scan data by the image data processing subsection 56.

In any of the cases where it is determined in the setup subsection 62 that the possibility that an eye region whose color is faulty due to the red-eye etc. is included in the image of the extracted face region is high, where an eye region whose color is to be corrected is automatically extracted (in the region automatic-extraction mode) and the extracted eye region is corrected for color, and where the designation of an eye region is required from the image of the face region in order to extract the eye region whose color is to be corrected (in the region designation mode) and the designated eye region is corrected for color, it is not necessarily needed to display the image of the face region or the eye region in enlargement on the monitor 20 and displaying the image as such without enlargement is also possible. For instance, it is not needed to display an image in enlargement on the automatic extraction and color correction of an eye region whose color is to be corrected. Again, the main subject in a recorded image is often the face of a person and in that case the confirmation of color correction of the eye region automatically extracted as well as the designation of an eye region in order to extract the eye region whose color is to be corrected and the confirmation of color correction after such designation can satisfactorily be carried out with an image displayed as such without enlargement.

In any of the embodiments as described above, a face region is initially extracted and then it is determined whether or not the possibility that an eye region whose color is faulty is included in the face region is high. If it is determined that the possibility is high, the automatic extraction of the eye region whose color is to be corrected or the designation of an eye region in order to set the eye region whose color is to be corrected is performed and the extracted or designated eye region whose color is to be corrected is subjected to color correction. The reason for employing such a procedure is as follows: since an eye is in a face without exception, it is easy to extract an eye from the face region having been extracted, although it takes rather long to extract a face from an image.

The present invention is, however, not limited to such embodiments but it is also possible according to the present invention to previously extract a region having characteristics similar to those of the eye region whose color is faulty to determine whether or not the possibility that the region thus extracted, which has characteristics similar to those of the eye region whose color is faulty, is included in a face region is high and, if the possibility determined high, to perform the automatic extraction of the face region or the designation of the face region or the eye region in order to decide or set the eye region whose color is to be corrected and then subject the eye region, whose color is to be corrected and which is determined as being included in the face region, to color correction.

In that case, a region having characteristics similar to those of the eye region whose color is faulty, such as a spot having a red-eye characteristic (not necessarily an eye but a given circular spot in red, for example), is initially extracted and then it is examined whether the spot is in the face or not. It takes long indeed to search from an image a spot (region) having characteristics similar to those of the eye region whose color is faulty due to the red-eye phenomenon etc. The time required for such a search is, however, less than that required for the extraction of a face region from an image because of the simpler characteristics of the spot than a face. In addition, the time required for the extraction of a face can be reduced in itself because, once the region having characteristics similar to those of the eye region whose color is faulty has been extracted, it is only needed to perform face extraction processing around the extracted region.

On employing this procedure, the face extraction processing may be performed in a heretofore-known manner, although it is preferable to perform the processing with respect to an area somewhat larger than conventional in all directions.

It is also possible in this procedure to further examine as required whether or not the extracted region is the eye region whose color is faulty due to the red-eye phenomenon etc. after the extraction of an eye and a face.

The image processing apparatus for implementing the image processing method of the present invention and the photoprinter 10 using the apparatus are basically arranged as described above.

Next, operation of the image processing apparatus of the present invention and the photoprinter 10 as well as the image processing method of the present invention will be described below mainly as to the red-eye color correcting method shown in FIG. 2.

The scanner 12 prescans the image of the film F and the signals sent from the scanner 12 are processed in the data processing section 40 and subjected to log conversion in the log converter 42 and then stored in the prescan memory 44 as prescan data. Thereafter, the signals are captured in the setup subsection 62, and various kinds of image processing conditions are automatically set thereby and supplied to the image data processing subsection 52 through the parameter coordinating subsection 66. Then, the image data processing subsection 52 executes various kinds of image processing. When the correction of color due to a red-eye is designated by the operator beforehand, the extraction of a face region described above is executed in the setup subsection 62 simultaneously with the execution of the various kinds of image processing (step 100).

Next, the setup subsection 62 determines the possibility of occurrence of the red-eye based on the recording information read by the recording information reading unit 36 or based on the information obtained from the customer information and the customer card (step 102). When the determination at step 102 is "NO", the red-eye color is not corrected on the assumption that no red-eye arises. Then, after the execution of the image processing and the inspection described above, fine scan is executed (step 120).

Whereas, when the determination at step 102 is "YES", a mode designated by the operator beforehand, that is, the region automatic-extraction mode or the region designation mode is selected (step 104).

When the color is corrected by the region automatic-extraction mode, the setup subsection 62 automatically extracts the region of the red-eye whose color is to be corrected by the method described above based on the image data having been subjected to the various kinds of image processing, and the information of the region is supplied to the image data processing subsection 52 of the prescan processing section 48 through the parameter coordinating subsection 66. The prescan processing section 48 executes color correction to the image, which has been subjected to the various kinds of image processing, by the method described above according to the preset color correction level (step 106).

Figure 3B:
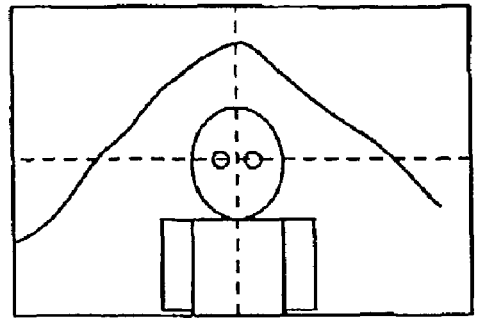

Thereafter, the overall image is displayed on the monitor 20 as an inspection image as shown in FIG. 3A. Further, when the screen of the image is switched by the manipulation unit 18, the extracted face region is displayed by being surrounded by a rectangular frame as shown by a dotted line in FIG. 3A. Otherwise, the extracted face region is displayed with color. Further, when it is instructed by the operator to inspect the red-eye color having been corrected, the monitor 20 displays the image in enlargement with the face region and more preferably an eye region disposed at the center of the image. It is needless to say that when there are a plurality of face regions, a plurality of images are displayed with the face regions disposed at the centers of the images (step 108). Since the overall image is displayed as shown in FIG. 3A, the inspection of the various kinds of image processing other than the correction of the red-eye color is executed. In contrast, the red-eye color having been corrected is inspected and confirmed by the image displayed in enlargement with the face region disposed at the center of the image as shown in FIG. 3B. That is, the regions displayed in enlargement are inspected, and the operator is requested to determine whether or not the regions having been corrected must be corrected again (step 110). When an indication for correcting the regions again is received from the operator, the range for extracting the eye region is adjusted by adjusting the range of the eye region whose color is to be corrected, that is, by changing the threshold value, which has been set, of the eye region for the correction of the color of which is determined by the score, or the color correction level is adjusted, as to the respective regions displayed in enlargement as described above (step 111). Then, the process returns to step 106. The red-eye color is repeatedly corrected until it is properly corrected as described above.

Next, the operator is requested to determine whether or not the correction of the red-eye color executed at step 106 is to be cancelled (step 112). When the correction is not cancelled, the red-eye color correction processing condition is fixed on the assumption that the red-eye color has been properly corrected.

In contrast, when the correction is cancelled, the region automatic-extraction mode is switched to the region designation mode for manually setting the region of the red-eye. In the region designation mode, the same sequence as that when the region designation mode is selected at step 104 is executed.

First, an image having been subjected to the various kinds of image processing is displayed on the monitor 20 with a face region disposed at the center of the image (step 114). Next, the operator is requested to designate a red-eye region, and the red-eye region is set by the operator through the manipulation unit 18 (step 116) as well as the color of the thus set red-eye region is automatically corrected by the method described above (step 118). In this case, the color correction level may be adjusted. Further, while not shown in FIG. 2, the color may be repeatedly corrected while changing the color correction level to correct the color most properly.

When the red-eye correction processing condition and the other image processing conditions have been fixed and the inspection of the corrected red-eye color has been completed, the red-eye correction processing condition and the other image processing conditions are stored together with the identification number and the customer information so that the same image is subjected to the same processing to cope with the reprint that will be executed later. In addition, the red-eye correction processing condition and the other image processing conditions are supplied to the image data processing subsection 56.

Then, the fine scan data having been obtained in the fine scan is subjected to image processing in the image data processing subsection 56 based on the image processing conditions and the red-eye color correction processing condition having been fixed as described above, and the image is output from the printer 16 as a print (step 120). Further, the fine scan data having been subjected to the image processing is output to a recording medium, and the like.

As described above, since the face region of a person in an image is extracted and the image is displayed in enlargement with the extracted face region disposed at the center of the image, the region of a red-eye whose color is to be corrected can be easily confirmed and inspected in a short time, and the color can be corrected.

While the above example shows the case in which the red-eye color is corrected, the present invention can be preferably used in trimming processing for mainly trimming a face by extracting the face region of a person in an image and displaying the image in enlargement with the extracted face region disposed at the center of the image. Further, the present invention also can be preferably used in the freckle and wrinkle removing processing.

Figure 4:
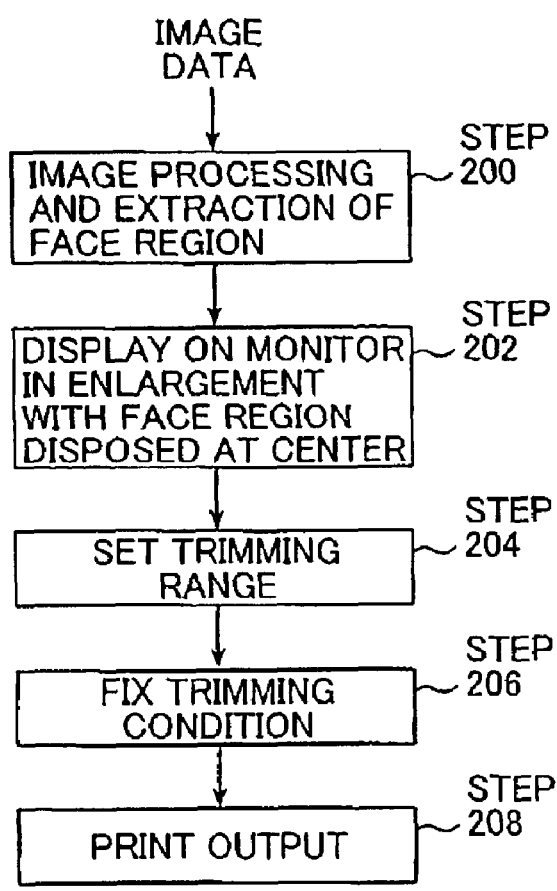
FIG. 4 is a flowchart showing an example of the flow of trimming processing executed by the image processing apparatus of the present invention.

In the case of, for example, the trimming processing, the image data of the prescan data is subjected to image processing in the image data processing subsection 52 based on the image processing conditions set in the setup subsection 62 as shown in FIG. 4 as well as a face region is extracted in the setup subsection 62 by the method described above (step 200). The information of the face region is supplied to the image data processing subsection 52 through the parameter coordinating subsection 66.

Figure 5A:
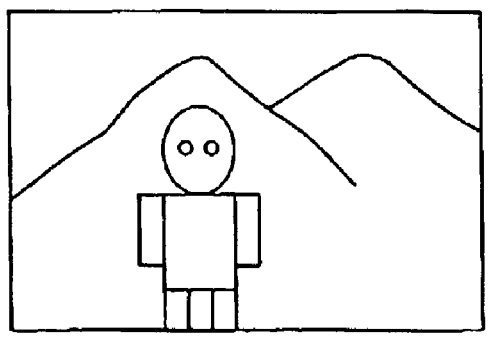
FIGS. 5A and 5B are views each showing an example of display screens obtained by the image processing apparatus of the present invention.
Figure 5B:
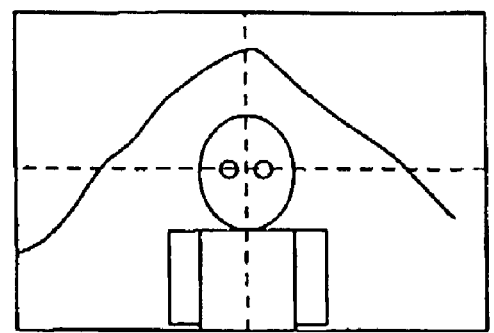

Next, the image of the image data is displayed on the monitor 20 with the face region disposed at the center of the image (step 202). For example, in the image shown in FIG. 5A, the image is displayed in enlargement with the face region disposed at the center of the image as shown in FIG. 5B according to the instruction from the operator for the trimming processing. The operator sets a trimming range by designating a desired region with the face of a person disposed at the center of the region while observing the image displayed in enlargement (step 204). Thus, after the image of the trimming range has been output to the monitor 20 and inspected by the operator, a trimming condition is fixed (step 206). Then, the image is output from the printer 16 as a print after the fine scan data obtained by the fine scan has been subjected to the image processing and to the trimming processing. Further, the fine scan data is output to a recording medium, and the like. It is needless to say that it is preferable to execute ordinary center trimming and free trimming when no person exists in an image and no face region is extracted. Further, it is preferable to switch the above method of displaying an image in enlargement with a face region disposed at the center of the image by the selection of the operator so that the ordinary center trimming and the free trimming can be arbitrarily executed.

As described above, when the trimming range is set with the face of a person disposed at the center of the trimming range, a processing time can be reduced as compared with a conventional method in which it is necessary to enlarge a person while moving it to the center of an image.

Further, the freckle and wrinkle removing processing is applied to the center of the face of a person by the retouch processing executed by the operator manually. However, since an image is displayed while enlarging the person at the center of the image, a processing time can be reduced as compared with a conventional method in which it is necessary to enlarge a person while moving it to the center of an image by scroll.

While the image processing apparatus and the image processing method of the present invention have been described above in detail with reference to various embodiments, the present invention is by no means limited to the above embodiments and it goes without saying that various improvements and modifications can be made within the range which does not depart from the gist of the present invention.

As described above in detail, according to the present invention, since the face region of a person in an image is extracted and the image is displayed in enlargement with the extracted region disposed at the center thereof, or again, since the region automatic-extraction mode for automatically extracting the region whose color is to be corrected and the region designation mode for requesting the designation of a region in order to extract the region whose color is to be corrected are provided and these two modes can be switched therebetween, the correction of a red-eye color, the trimming processing, and the freckle and wrinkle removing processing can be easily confirmed and inspected in a short time.

What is claimed is:

1. An image processing apparatus comprising:
   an image processing unit for executing image processing based on image data of an image;
   a region extracting unit for automatically extracting a main subject region corresponding to a main subject in said image for the image processing; and
   an image display unit for displaying said image in enlargement with said main subject region disposed at a center of image,
   wherein said main subject region in said image is a face region of a person, further comprising:
   a determination device for determining whether or not a possibility that an eye region whose color is faulty is included in an image of the face region is high,
   wherein, when the determination device determines that the possibility that an eye region whose color is faulty is included in the image of the face region is high, said region extracting unit extracts an eye region whose color is to be corrected as well as said image processing unit corrects the color of the thus extracted eye region, and said image display unit displays an image showing a result of correction of the color of the eye region in enlargement with the eye region disposed at the center of image,
   wherein when a plurality of eye regions are corrected for color, said image display unit displays an image with each of the eye regions disposed at the center of image, and
   wherein said image display unit displays the image with each of the eye regions disposed at the center according to a sequence of sizes of the eye regions which have been corrected for color.

2. The image processing apparatus according to claim 1, wherein when a plurality of said main subject regions are extracted by said region extracting unit, said image display unit displays said image in enlargement with each of said main subject regions thus extracted disposed at the center of image.

3. The image processing apparatus according to claim 2, wherein said image display unit displays said image in enlargement according to a sequence of certainties of said extracted main subject regions.

4. The image processing apparatus according to claim 3, wherein the certainty of said main subject region is determined using at least one of a position of said main subject region, a size of said main subject region, a direction of said main subject, and an image characteristic amount of said main subject region.

5. The image processing apparatus according to claim 1, wherein when an instruction indicating that an eye region whose color has been corrected is improper is received, it is required to adjust a range of an eye region, which is to be extracted by said region extracting unit and whose color is to be corrected, in order to correct the color again.

6. The image processing apparatus according to claim 1, wherein when an instruction indicating that a result of color correction is improper is received, it is required to adjust a correction level of color correction executed in said image processing unit in order to correct the color again.

7. The image processing apparatus according to claim 1,
   wherein said region extracting unit has a region automatic-extraction mode for automatically extracting an eye region whose color is to be corrected and a region designation mode for requesting a designation of an eye region from the image of the face region displayed in enlargement on said image display unit in order to set the eye region whose color is to be corrected, either mode being effective when said determination device determines that the possibility that an eye region whose color is faulty is included in the image of the face region is high, and said region automatic-extraction mode and said region designation mode can be switched therebetween.

8. The image processing apparatus according to claim 1, wherein said main subject region in said image is a region having characteristics similar to those of an eye region, whose color is faulty, of a person, further comprising:
   a determination device for determining whether or not a possibility that the region having characteristics similar to those of the eye region whose color is faulty is included in a face region of said person is high,
   wherein said region extracting unit has a region automatic-extraction mode for automatically extracting a face region of said person in which an eye region whose color is to be corrected is included and a region designation mode for requesting a designation of an eye region or a face region from an image of the region having characteristics similar to those of the eye region whose color is faulty displayed in enlargement on said image display unit in order to set the eye region whose color is to be corrected, either mode being effective when said determination device determines that the possibility that a region having characteristics similar to those of an eye region whose color is faulty is included in said face region is high, and said region automatic-extraction mode and said region designation mode can be switched therebetween.

9. The image processing apparatus according to claim 1, wherein said determination device executes determination based on information about at least one of a recording time, a recording place, a light source for recording, lighting, presence or absence of emission by an electronic flash, a type of a camera used in recording, a recording exposure condition, and a result of analysis of a recorded scene.

10. The image processing apparatus according to claim 1, wherein when it is determined that a result of color correction is proper, a range of the eye region whose color is to be corrected and a correction level of color correction of the eye region are at least stored so that similar image processing may be executed repeatedly.

11. The image processing apparatus according to claim 1, wherein said image processing unit executes trimming processing with said main subject region disposed at a center of trimming by using the image displayed in enlargement on said image display unit.

12. An image processing apparatus comprising:
   an image processing unit for executing image processing based on image data of an image;
   a region extracting unit for automatically extracting a face region corresponding to a face of a person in said image for the image processing;
   a determination device for determining whether or not a possibility that an eye region whose color is fruity is included in an image of said face region is high; and
   a display unit for displaying at least the image of said face region,
   wherein said region extracting unit has a region automatic-extraction mode for automatically extracting an eye region whose color is to be corrected and a region designation mode for requesting a designation of an eye region from the image of said face region displayed on said display unit in order to set the eye region whose color is to be corrected, either mode being effective when said determination device determines that the possibility that an eye region whose color is faulty is included in the image of the face region is high, and said region automatic-extraction mode and said region designation mode can be switched therebetween,
   wherein when a plurality of eye regions are corrected for color, said display unit displays an image with each of the eye regions disposed at the center of image, and
   wherein said display unit displays the image with each of the eye regions disposed at the center according to a sequence of sizes of the eye regions which have been corrected for color.

13. The image processing apparatus according to claim 12, wherein said determination device executes determination based on information about at least one of a recording time, a recording place, a light source for recording, lighting, presence or absence of emission by an electronic flash, a type of a camera used in recording, a recording exposure condition, and a result of analysis of a recorded scene.

14. The image processing apparatus according to claim 12, wherein when it is determined that a result of color correction is proper, a range of the eye region whose color is to be corrected and a correction level of color correction of the eye region are at least stored so that similar image processing may be executed repeatedly.

15. An image processing method for executing image processing based on image data of an image, comprising steps of:
   extracting automatically a main subject region corresponding to a main subject in said image for the image processing; and
   displaying said image in enlargement with said main subject region disposed at a center of image,
   wherein the main subject region in said image is a face region of a person, further comprising steps of:
      determining whether or not a possibility that an eye region whose color is faulty is included in an image of the face region is high; as well as when it is determined that the possibility that an eye region whose color is faulty is included in the image of the face region is high,
      extracting an eye region whose color is to be corrected and correcting the color of the extracted eye region; and
      displaying an image showing a result of correction of the color of the eye region in enlargement with the eye region disposed at the center of image,
   wherein when a plurality of eye regions are corrected for color, an image is displayed with each of the eye regions disposed at the center of image, and
   wherein the image with each of the eye regions disposed at the center is displayed according to a sequence of sizes of the eye regions which have been corrected for color.

16. The image processing method according to claim 15, wherein, when a plurality of said main subject regions are extracted, said image is displayed in enlargement with each of said main subject regions thus extracted disposed at the center of image.

17. The image processing method according to claim 16, wherein said image is displayed in enlargement according to a sequence of certainties of said extracted main subject regions.

18. The image processing method according to claim 17, wherein the certainty of said main subject region is determined using at least one of a position of said main subject region, a size of said main subject region, a direction of said main subject, and an image characteristic amount of said main subject region.

19. The image processing method according to claim 15, wherein when an instruction indicating that an eye region whose color has been corrected is improper is received, it is required to adjust a range of an eye region, which is to be extracted and whose color is to be corrected, in order to correct the color again.

20. The image processing method according to claim 15, wherein when an instruction indicating that a result of color correction is improper is received, it is required to adjust a correction level of color correction in said image processing.

21. The image processing method according to claim 15, wherein the main subject region in said image is a face region of a person, further comprising steps of:
   determining whether or not a possibility that an eye region whose color is faulty is included in an image of the face region is high; as well as when it is determined that the possibility that an eye region whose color is faulty is included in the image of the face region is high,
   displaying an image with said face region disposed at the center of image;

requiring to designate an eye region from the image displayed in enlargement to set an eye region whose color is to be corrected; and correcting the color of the thus designated eye region.

22. The image processing method according to claim 15, wherein the main subject region in said image is a face region of a person, further comprising a step of:

determining whether or not a possibility that an eye region whose color is faulty is included in an image of the face region is high, wherein the method includes a region automatic-extraction mode for automatically extracting an eye region whose color is to be corrected and a region designation mode for requesting a designation of an eye region from the image of the face region in order to set the eye region whose color is to be corrected, either mode being effective when it is determined that the possibility that an eye region whose color is faulty is included in the image of the face region is high, and said region automatic-extraction mode and said region designation mode can be switched therebetween.

23. The image processing method according to claim 15, wherein said main subject region in said image is a region having characteristics similar to those of an eye region, whose color is faulty, of a person, further comprising a step of:

determining whether or not a possibility that the region having characteristics similar to those of the eye region whose color is faulty is included in a face region of said person is high, wherein the method includes a region automatic-extraction mode for automatically extracting a face region of said person in which an eye region whose color is to be corrected is included and a region designation mode for requesting a designation of an eye region or a face region from an image of the region having characteristics similar to those of the eye region whose color is faulty in order to set the eye region whose color is to be corrected, either mode being effective when it is determined that the possibility that a region having characteristics similar to those of an eye region whose color is faulty is included in the face region is high, and said region automatic-extraction mode and said region designation mode can be switched therebetween.

24. The image processing method according to claim 15, wherein said determination is executed based on information about at least one of a recording time, a recording place, a light source for recording, lighting, presence or absence of emission by an electronic flash, a type of a camera used in recording, a recording exposure condition, and a result of analysis of a recorded scene.

25. The image processing method according to claim 15, wherein when it is determined that a result of color correction is proper, a range of the eye region whose color is to be corrected and a correction level of color correction of the eye region are at least stored so that similar image processing may be executed repeatedly.

26. The image processing method according to claim 15, wherein trimming processing is executed with said main subject region disposed at a center of trimming by using the image displayed in enlargement.

27. An image processing method for executing image processing based on image data of an image, comprising steps of:

extracting automatically a face region corresponding to a face of a person in said image for the image processing; and determining whether or not a possibility that an eye region whose color is faulty is included in an image of said face region is high, wherein the method includes a region automatic-extraction mode for automatically extracting an eye region whose color is to be corrected and a region designation mode for requesting a designation of an eye region from the displayed image of said face region in order to set the eye region whose color is to be corrected, either mode being effective when it is determined that the possibility that an eye region whose color is faulty is included in the image of the face region is high, and said region automatic-extraction mode and said region designation mode can be switched therebetween, wherein when a plurality of eye regions are corrected for color, an image is displayed with each of the eye regions disposed at the center of image, and wherein the image with each of the eye regions disposed at the center is displayed according to a sequence of sizes of the eye regions which have been corrected for color.

28. The image processing method according to claim 27, wherein said determination is executed based on information about at least one of a recording time, a recording place, a light source for recording, lighting, presence or absence of emission by an electronic flash, a type of a camera used in recording, a recording exposure condition, and a result of analysis of a recorded scene.

29. The image processing method according to claim 27, wherein when it is determined that a result of color correction is proper, a range of the eye region whose color is to be corrected and a correction level of color correction of the eye region are at least stored so that similar image processing may be executed repeatedly.

30. The image processing apparatus of claim 1, wherein the enlargement in the image display unit takes up an entire field of view of image.

31. The image processing apparatus of claim 1, wherein the region extracting unit extracts a plurality of main subject regions corresponding to the main subject in the image for the image processing.

32. The image processing apparatus of claim 31, wherein the image display unit sequentially displays the extracted plurality of main subject regions with each of the main subject region disposed at a center.

33. The image processing apparatus of claim 4, wherein the certainty of said main subject region is determined by a weight score, the weight score calculated based on a ratio of area of face candidate region and the direction of the main subject region.

* * * * *